United States Patent
Nakamura

(10) Patent No.: US 10,348,984 B2
(45) Date of Patent: Jul. 9, 2019

(54) IMAGE PICKUP DEVICE AND IMAGE PICKUP METHOD WHICH PERFORMS DIAGONAL PIXEL OFFSET AND CORRECTS A REDUCED MODULATION DEPTH IN A DIAGONAL DIRECTION

(71) Applicant: HITACHI KOKUSAI ELECTRIC INC., Tokyo (JP)

(72) Inventor: Kazuhiko Nakamura, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 20 days.

(21) Appl. No.: 15/507,285

(22) PCT Filed: Aug. 24, 2015

(86) PCT No.: PCT/JP2015/073706
§ 371 (c)(1),
(2) Date: Feb. 28, 2017

(87) PCT Pub. No.: WO2016/031764
PCT Pub. Date: Mar. 3, 2016

(65) Prior Publication Data
US 2017/0289471 A1    Oct. 5, 2017

(30) Foreign Application Priority Data
Aug. 28, 2014    (JP) .................................. 2014-173902

(51) Int. Cl.
*H04N 5/357*    (2011.01)
*G06T 3/40*    (2006.01)
(Continued)

(52) U.S. Cl.
CPC ............. *H04N 5/357* (2013.01); *G06T 3/403* (2013.01); *G06T 3/4007* (2013.01);
(Continued)

(58) Field of Classification Search
CPC ...... H04N 5/357; H04N 5/3696; H04N 9/045; H04N 2209/046; G06T 3/4007; G06T 3/4015; G06T 5/001; G06T 3/403
See application file for complete search history.

(56) References Cited

U.S. PATENT DOCUMENTS 7,586,525 B2 * 9/2009 Tamaru .................. H04N 5/357
348/222.1
2009/0066821 A1 * 3/2009 Achong ................. H04N 9/045
348/273
(Continued)

FOREIGN PATENT DOCUMENTS

JP    H06-350877 A    12/1994
JP    2002-064835 A    2/2002
(Continued)

OTHER PUBLICATIONS

International Search Report dated Oct. 13, 2015.
(Continued)

*Primary Examiner* — Luong T Nguyen
(74) *Attorney, Agent, or Firm* — Bacon & Thomas, PLLC

(57) ABSTRACT

The purpose of the present invention is to correct the reduced degree of modulation in a diagonal direction in a four-plate camera having a frame memory and R, G1, G2, and B image pickup elements among which two green image pickup elements (G1, G2) shift pixels diagonally. This image pickup method is provided for an image pickup device having two green image pickup elements, a red image pickup element, and a blue image pickup element among which the two green image pickup elements shift pixels diagonally. The method includes, with respect to a contour correction target pixel, generating a diagonal contour correction signal from respective image signals of two diagonally upper left pixels, two diagonally upper right pixels, two diagonally lower left pixels, and two diagonally lower (Continued)

right pixels, and adding the diagonal contour correction signal to an image signal of the contour correction target pixel.

4 Claims, 14 Drawing Sheets

(51) Int. Cl.
  *H04N 5/369* (2011.01)
  *H04N 9/04* (2006.01)
(52) U.S. Cl.
  CPC ......... *G06T 3/4015* (2013.01); *H04N 5/3696* (2013.01); *H04N 9/045* (2013.01)

(56) References Cited

U.S. PATENT DOCUMENTS

| | | | | |
|---|---|---|---|---|
| 2009/0091646 A1* | 4/2009 | Manabe | ................ | G06T 3/4015 348/273 |
| 2013/0294687 A1* | 11/2013 | Fujimiya | .............. | G06K 9/4604 382/165 |
| 2014/0307141 A1* | 10/2014 | Tanaka | .................... | H04N 9/07 348/281 |

FOREIGN PATENT DOCUMENTS

| JP | 2004-088497 A | 3/2004 |
|---|---|---|
| JP | 2011-182354 A | 9/2011 |

OTHER PUBLICATIONS

Kohji Mitani et al., "A Study of Spatial Offset Method in the Diagonal Direction for a Very High Resolution Pickup System", The Journal of the Institute of Television Engineers of Japan, 1996 vol. 50, No. 8, pp. 1073 to 1079, ISSN 03866831.

Takayuki Yamashita et al., "Ultrahigh-definition 4-CCD Video Camera System with 4,000 Scanning Lines", NHK Science and Technical Research Laboratories R&D, 2004, No. 83, pp. 44 to 51, ISSN 0914-7535.

* cited by examiner

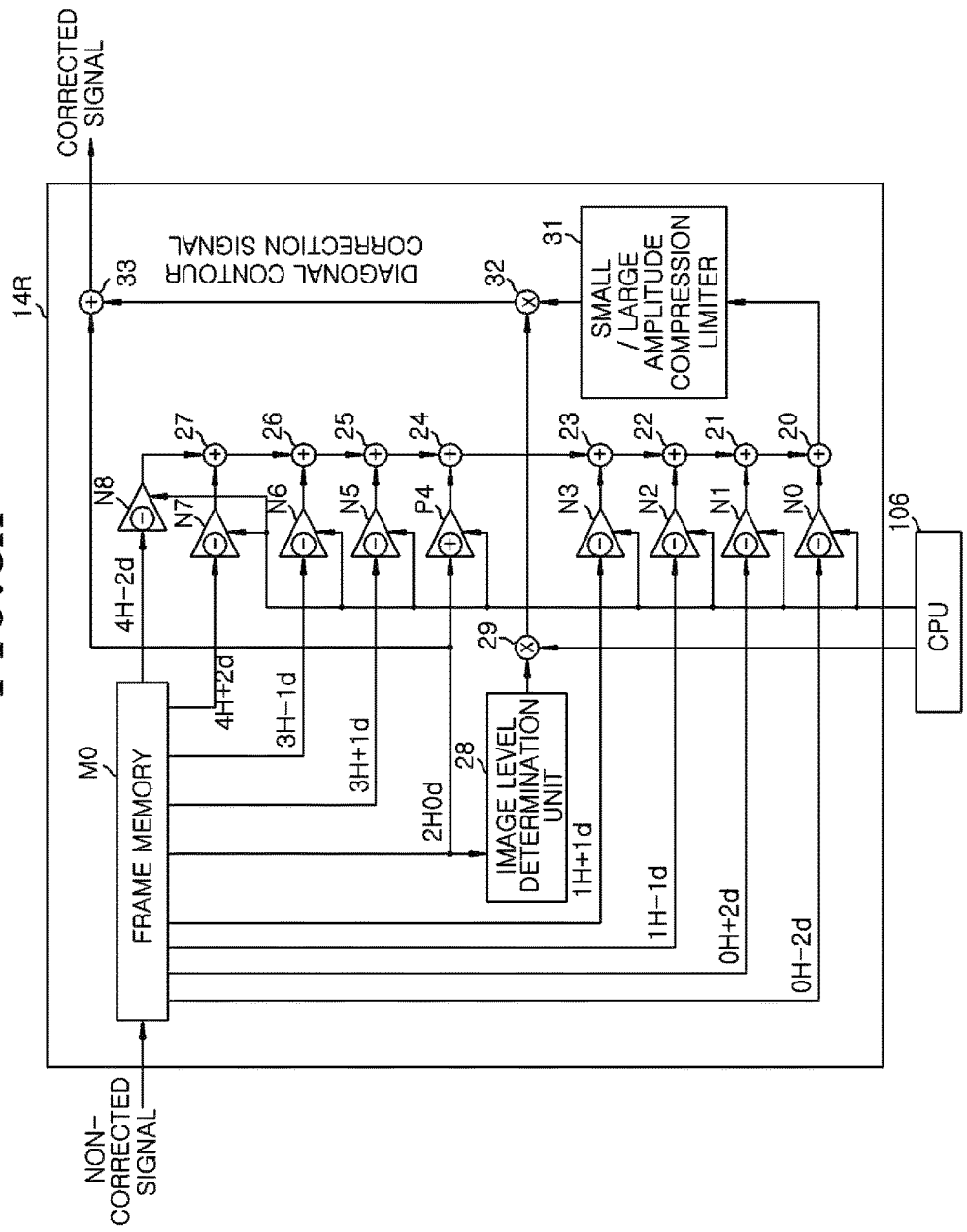

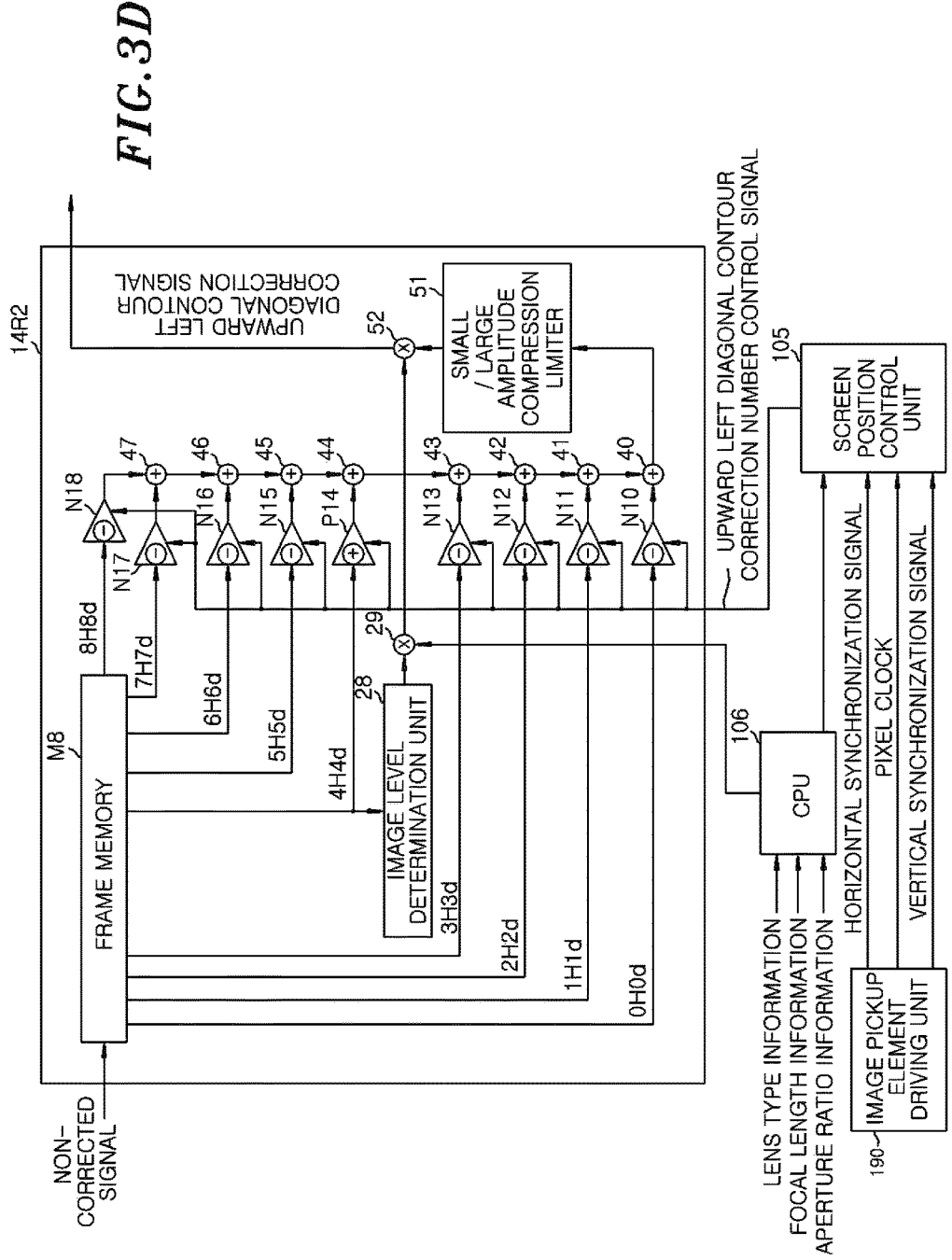

<ARRAY OF ONE EMBODIMENT>

<CORRESPONDING TO BAYER ARRAY>

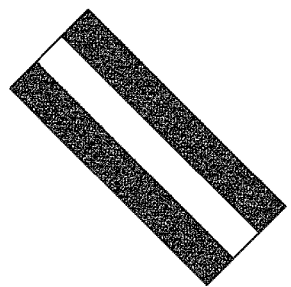 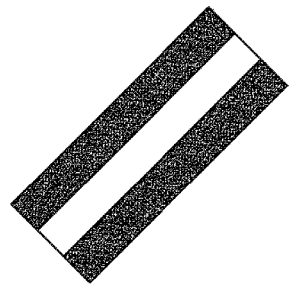

⎡ UPWARD LEFT DIAGONAL IMAGE ⎤    ⎡ UPWARD RIGHT DIAGONAL IMAGE ⎤
⎢ RESOLUTION CANNOT BE ACHIEVED ⎥    ⎢ RESOLUTION CANNOT BE ACHIEVED ⎥
⎣ BY INTERPOLATIONS OF G1 AND G2 ⎦    ⎣ BY INTERPOLATIONS OF G1 AND G2 ⎦

 

⎡ VERTICAL IMAGE ⎤    ⎡ HORIZONTAL IMAGE ⎤
⎢ RESOLUTION CAN BE ACHIEVED ⎥    ⎢ RESOLUTION CAN BE ACHIEVED ⎥
⎣ BY INTERPOLATIONS OF G1 AND G2 ⎦    ⎣ BY INTERPOLATIONS OF G1 AND G2 ⎦

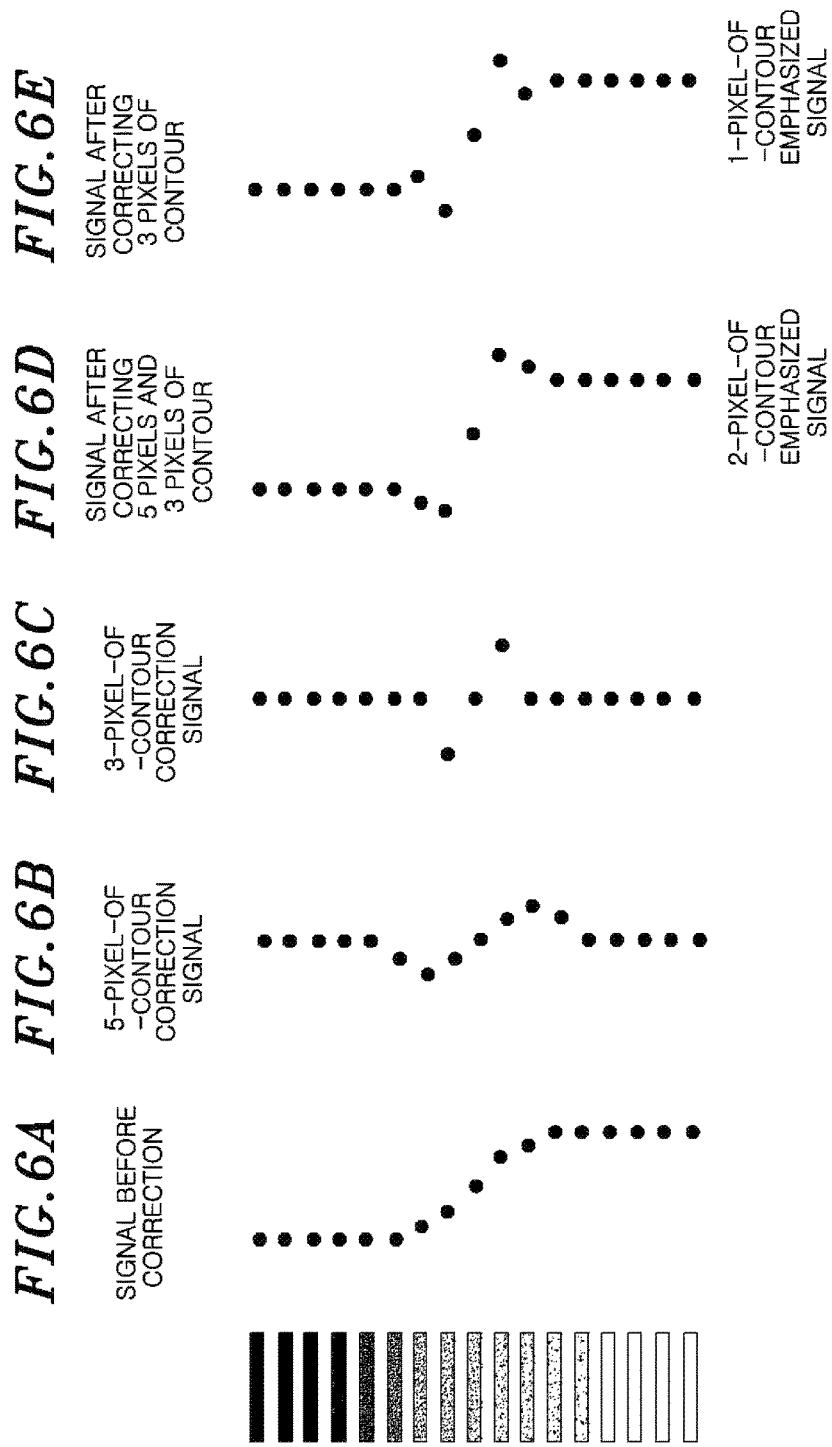

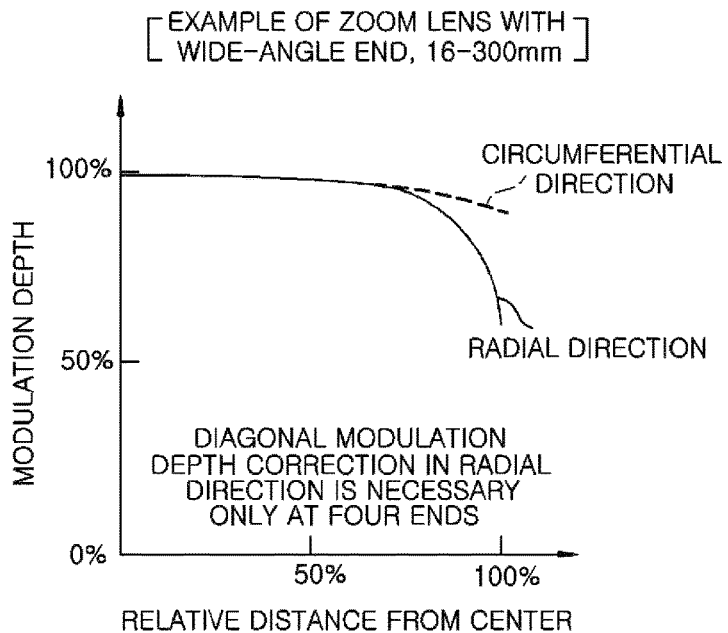
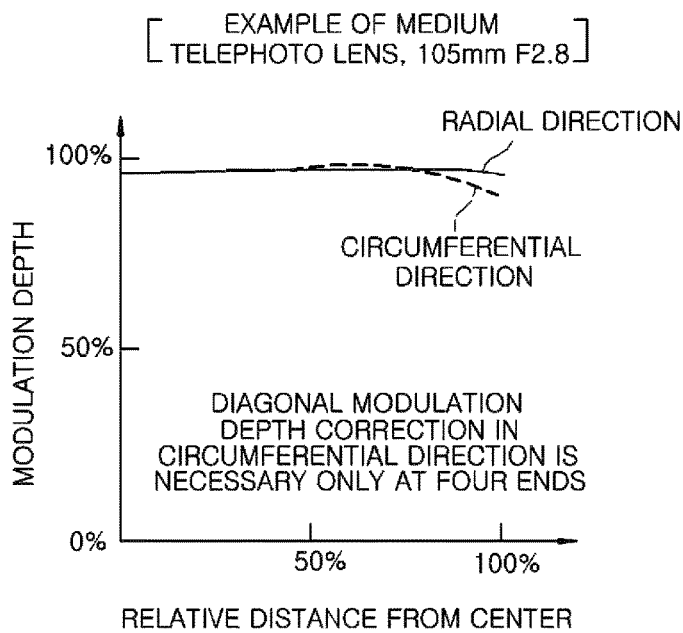

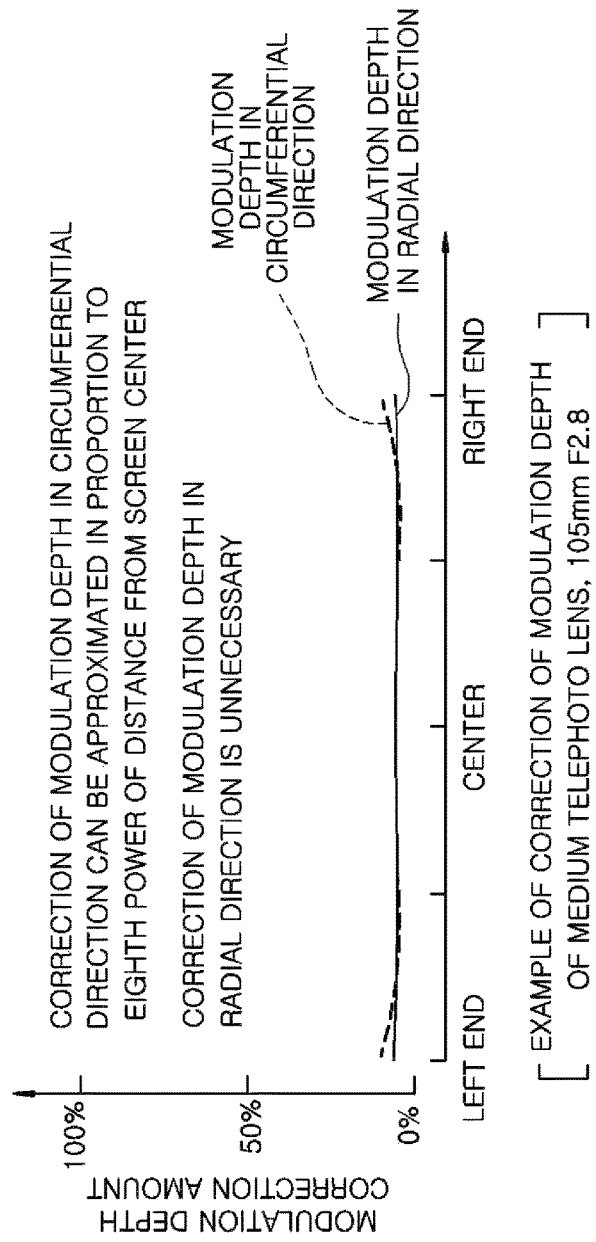

IMAGE PICKUP DEVICE AND IMAGE PICKUP METHOD WHICH PERFORMS DIAGONAL PIXEL OFFSET AND CORRECTS A REDUCED MODULATION DEPTH IN A DIAGONAL DIRECTION

FIELD OF THE INVENTION

The present invention relates to an image pickup device using an image pickup element and an image pickup method.

BACKGROUND OF THE INVENTION

Recently, correlated double sampling (CDS) for removing noise from a signal outputted from a charge coupled device (CCD), dark current correction, automatic gain control (AGC), and analog front end (AFE) including analog digital converter (ADC) for conversion into a digital image signal Vi have become widespread. The ADC of the AFE conventionally has 10-bit gradation, but 12-bit or 14-bit gradation has become generalized.

Further, improvements have been made to a complementary metal oxide semiconductor (CMOS) image pickup device including a drive circuit together with a readout circuit to achieve a high-speed readout.

In addition, as the integration of digital signal processing circuits progresses, it becomes possible to easily perform an operation of storing and arithmetically processing output signals of a plurality of lines not only by a memory integrated digital signal processor (DSP) for processing only images, but also by an inexpensive general-purpose field programmable gate array (FPGA). A megapixel camera with more than 1 million pixels, a high definition television (HDTV) camera, a high-speed image pickup HDTV camera, a HDTV camera with a recording unit, a HDTV camera with an Internet Protocol (IP) transmission unit, and a higher resolution 2K×4K camera or 4K×8K camera including an uncompressed recording device using ultra high definition television (UHDTV) or hard disk drive (HDD) have also become commercialized. Also in a flat image display device, UHDTV display of 2K×4K or 4K×8K of higher definition, high-speed display and an ultra-thin profile have been achieved.

Further, a conventional image signal processing apparatus determines a diagonal direction of a contour of an image signal. Based on the determination result of the diagonal direction of the contour, the apparatus generates interpolation pixel data by using a plurality of original pixel data in the image signal, and generates an image signal with an increased number of pixels. The characteristics for generating high frequency signal components vary depending on the determination result of the diagonal direction of the contour (see Patent Document 1).

Further, conventionally, there is an image processing apparatus configured to suppress a moiré of diagonal aperture correction (see Patent Document 2).

In addition, there are image pickup devices for multi-scan line vertical contour correction and multi-pixel horizontal contour correction (see Patent Document 3).

Patent Document 1: Japanese Patent Application Publication No. 2013-207673

Patent Document 2: Japanese Patent Application Publication No. 2007-336384

Patent Document 3: Japanese Patent Application Publication No. 2013-008260

SUMMARY OF THE INVENTION

The present invention provides a four-plate camera having a frame memory and red (R), green (G1 and G2) and blue (B) image pickup elements, and configured to perform diagonal-pixel-offset with two green image pickup elements G1 and G2 and to correct a reduced modulation depth in a diagonal direction.

In accordance with an aspect of the present invention, there is provided an image pickup method of an image pickup device having two green image pickup elements, a red image pickup element and a blue image pickup element, wherein the two green image pickup elements perform diagonal pixel offset. The image pickup method includes: generating a diagonal contour correction signal from respective image signals of two pixels on an upward left diagonal side, two pixels on an upward right diagonal side, two pixels on a downward left diagonal side, and two pixels on a downward right diagonal side with respect to a contour correction target pixel; and adding the diagonal contour correction signal to an image signal of the contour correction target pixel.

In accordance with another aspect of the present invention, there is provided an image pickup device having two green image pickup elements, a red image pickup element and a blue image pickup element, wherein the two green image pickup elements perform diagonal pixel offset. The image pickup device includes: a first generating unit configured to generate an upward right diagonal contour correction signal from respective image signals of four pixels on an upward right diagonal side and four pixels on a downward left diagonal side with respect to a contour correction target pixel; a second generating unit configured to generate an upward left diagonal contour correction signal from respective image signals of four pixels on an upward left diagonal side and four pixels on a downward right diagonal side with respect to the contour correction target pixel; and an adder. The adder adds the upward right diagonal contour correction signal and the upward left diagonal contour correction signal to an image signal of the contour correction target pixel.

In accordance with still another aspect of the present invention, there is provided an image pickup device having two green image pickup elements, a red image pickup element and a blue image pickup element, wherein the two green image pickup elements perform diagonal pixel offset. The image pickup device includes: a screen position control unit configured to calculate, from a vertical synchronization signal, a horizontal synchronization signal and a pixel clock, an upward right diagonal contour correction amount and an upward left diagonal contour correction amount for each diagonal frequency, corresponding to screen positions in proportion to a distance of a pixel corresponding to an image signal from a screen center, in proportion to the square of the distance of the pixel from the screen center, in proportion to the fourth power of the distance of the pixel from the screen center, in proportion to the sixth power of the distance of the pixel from the screen center, and in proportion to the eighth power of the distance of the pixel from the screen center.

Further, the image pickup device described above further includes a central processing unit configured to acquire information on a product type, focal length and aperture ratio of an attached lens, and information on a modulation depth in a circumferential direction and a modulation depth in a radial direction corresponding to the focal length and the aperture ratio of the attached lens, and output the acquired information to the screen position control unit. The screen position control unit is further configured to output a control signal for generating a contour correction signal based on the acquired information.

Effect of the Invention

According to the present invention, the four-plate camera having red (R), green (G1 and G2) and blue (B) image pickup elements and configured to perform diagonal pixel offset with the G1 and G2 image pickup elements performs contour correction for enhancing right and left diagonal contour corrections having a low modulation depth, thereby improving a visually important diagonal contour and modulation depth.

BRIEF DESCRIPTION OF THE DRAWINGS

FIG. 3A is a block diagram of a multi-scan line diagonal contour correction unit according to one embodiment of the present invention.

FIG. 3D is a block diagram of an upward left diagonal contour correction unit according to one embodiment of the present invention.

FIGS. 5A to 5D are schematic views showing a difference between a diagonal resolution and a horizontal/vertical resolution obtained by diagonal interpolations of G1 and G2 for pixels of the image pickup elements of the four plates.

FIGS. 6A to 6E schematically illustrate a method of generating a multi-pixel contour correction signal according to one embodiment of the present invention.

FIGS. 8A and 8B are schematic diagrams showing a change in modulation depth of a lens whose spherical aberration and coma aberration are sufficiently corrected and whose astigmatism is insufficiently corrected.

FIGS. 9A and 9B are schematic diagrams showing correction of the modulation depth of a lens whose spherical aberration and coma aberration are sufficiently corrected and whose astigmatism is insufficiently corrected.

DETAILED DESCRIPTION OF THE EMBODIMENTS

Hereinafter, embodiments of the present invention will be described with reference to the accompanying drawings.

Figure 1:
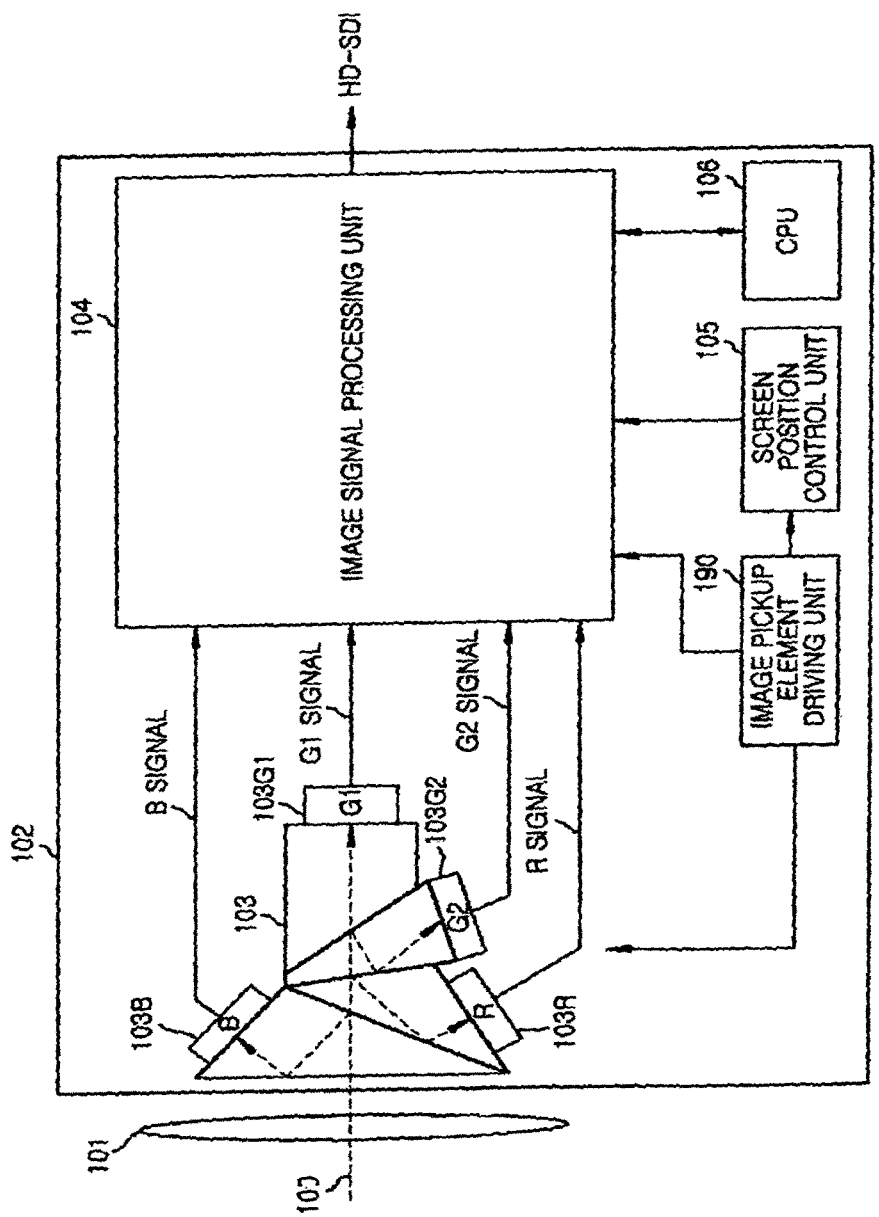
FIG. 1 is a block diagram showing a configuration example of an image pickup device according to one embodiment of the present invention.

FIG. 1 is a block diagram showing a configuration example of an image pickup device according to an embodiment of the present invention.

In FIG. 1, an image pickup device 102 includes a color separation optical system 103, a first green (G1) image pickup element 103G1, a second green (G2) image pickup element 103G2, a red (R) image pickup element 103R, a blue (B) image pickup element 103B, an image signal processing unit 104, an image-pickup-element driving unit 190, a screen-position control unit 105, and a central processing unit (CPU) 106.

Incident light 100, which is incident upon the image pickup device 102, is imaged by a lens 101 and color-separated into four lights for four plates by the color separation optical system 103. The four lights are photoelectrically converted by the first green image pickup element 103G1, the second green image pickup element 103G2, the red image pickup element 103R and the blue image pickup element 103B. The photoelectrically converted signals are subjected to various signal processings by the image signal processing unit 104. Consequently, the image pickup device 102 outputs a high-definition serial digital interface (HD-SDI) signal.

Further, an image signal outputted from the image pickup device 102 of the present invention is not limited to the HD-SDI signal, and may be a compressed image signal, an encrypted image signal or the like.

(Alignment Position and Resolution of the Image Pickup Element)

Hereinafter, an alignment position and a resolution of the image pickup element will be described with reference to FIGS. 4A to 5D.

Figure 4A:
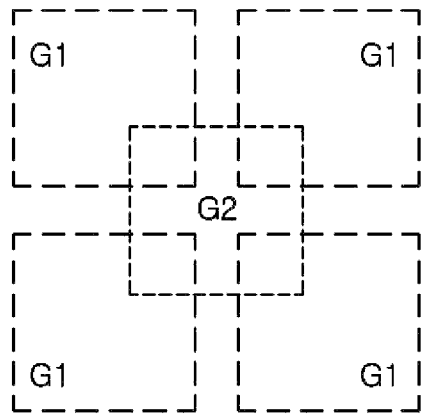
FIGS. 4A and 4B are schematic views showing an overlapping state of pixels at the alignment positions of the image pickup elements of the four plates of the image pickup device according to one embodiment of the present invention.
Figure 4B:
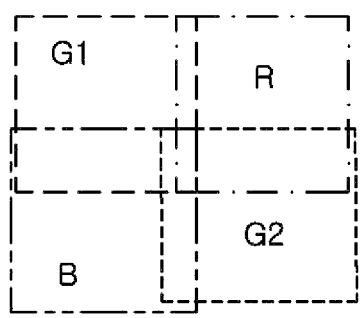

FIGS. 4A and 4B are schematic views each showing an overlapping state of pixels at the alignment positions of the image pickup elements of the four plates of the image pickup device according to an embodiment of the present invention.

FIGS. 5A to 5D are schematic views showing a difference between a diagonal resolution and a horizontal/vertical resolution obtained by diagonal interpolations of G1 and G2 for pixels of the image pickup elements of the four plates.

FIG. 4A shows an example of the alignment positions of the image pickup elements for pixels of the first green (G1) image pickup element 103G1 and the second green (G2) image pickup element 103G2.

FIG. 4B shows an example of the alignment positions of the image pickup elements for pixels corresponding to a Bayer array.

In general image processing at the alignment positions for the pixels shown in FIGS. 4A and 4B, in cases of a vertical line image of FIG. 5C and a horizontal line image of FIG. 5D, a desired resolution can be achieved by the interpolations of G1 and G2. However, in cases of an upward left diagonal image of FIG. 5A and an upward right diagonal image of FIG. 5B, a desired resolution cannot be achieved by the interpolations of G1 and G2.

Next, an interpolation process of the embodiment of the present invention will be described with reference to FIG. 2.

Figure 2:
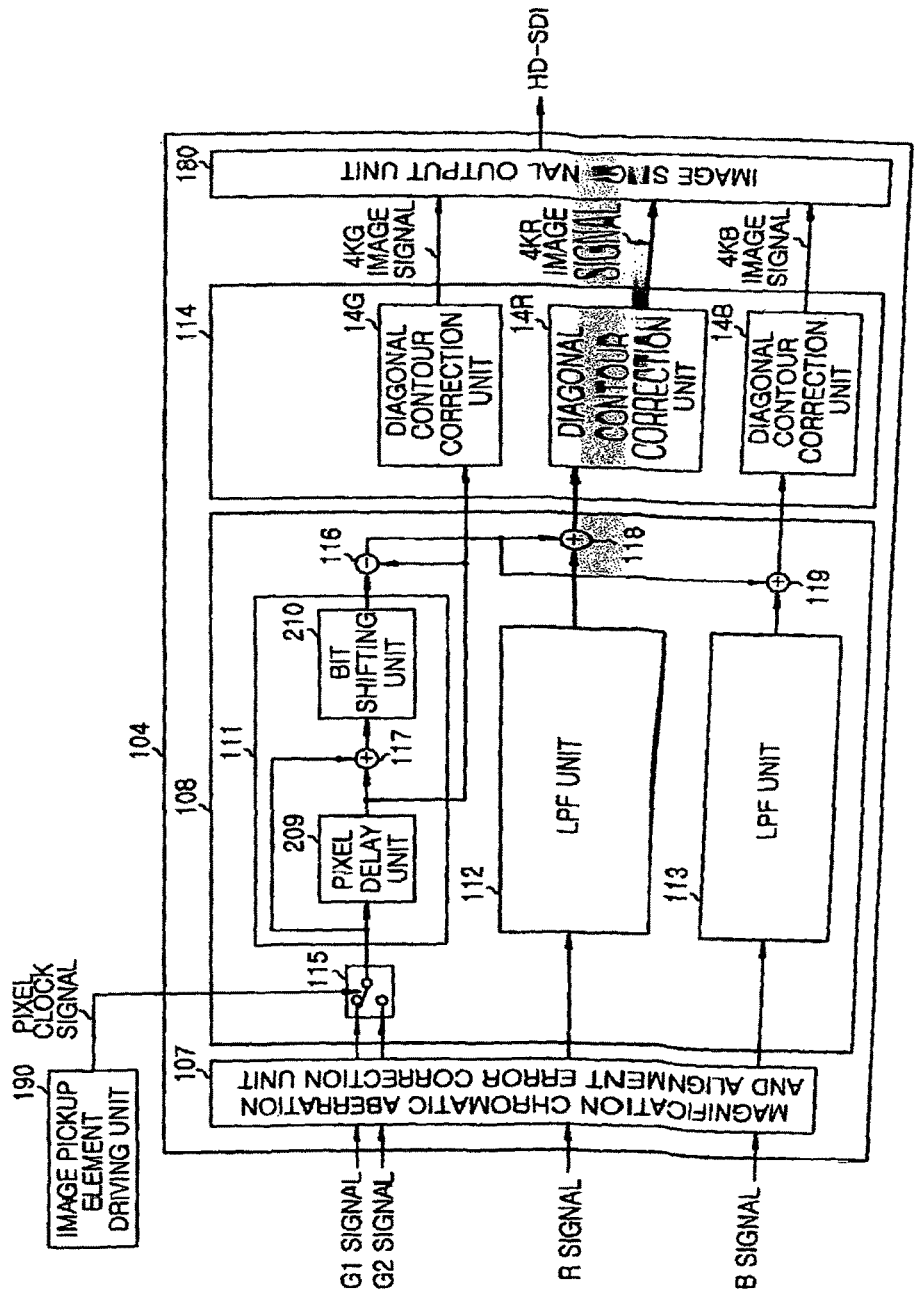
FIG. 2 is a block diagram showing an interpolation process according to one embodiment of the present invention.

FIG. 2 is a block diagram showing an interpolation process according to the embodiment of the present invention.

In FIG. 2, the image signal processing unit 104 includes a magnification chromatic aberration and alignment error correction unit 107, an interpolation processing unit 108, a diagonal contour correction unit 114, and an image signal output unit 180.

The magnification chromatic aberration and alignment error correction unit 107 corrects magnification chromatic aberration occurring in the lens with respect to input G1, G2, R and B signals, corrects an alignment error of the image pickup elements and the color separation optical system 103, and outputs the correction results to the interpolation processing unit 108.

The interpolation processing unit 108 includes a selector 115, a low pass filter (LPF) unit 111, a low pass filter (LPF) unit 112, a low pass filter (LPF) unit 113, a subtractor 116, an adder 118, and an adder 119.

In the interpolation processing unit 108, the input G1 signal and the input G2 signal are added by the selector 115 to generate a G1+G2 signal. Then, the G1+G2 signal is delayed by a pixel delay unit 209 of the LPF unit 111. The adder 117 of the LPF unit 111 adds a non-delayed G1+G2 signal to the delayed G1+G2 signal, and the signal outputted from the adder 117 is delayed for a predetermined time period by a bit shifting unit 210 of the LPF unit 111. Then, the subtractor 116 subtracts the output of the bit shifting unit 210 from the output of the pixel delay unit 209 to generate a G difference signal.

The adder 118 adds the G differential signal to the R signal processed by the LPF unit 112.

The adder 119 adds the G difference signal to the B signal processed by the LPF unit 113.

The diagonal contour correction unit 114 includes a diagonal contour correction unit 14G, a diagonal contour correction unit 14R, and a diagonal contour correction unit 14B.

The diagonal contour correction unit 14G performs diagonal contour correction on the G signal outputted from the interpolation processing unit 108 and outputs it as a 4KG image signal.

The diagonal contour correction unit 14R performs diagonal contour correction on the R signal outputted from the interpolation processing unit 108 and outputs it as a 4KR image signal.

The diagonal contour correction unit 14B performs diagonal contour correction on the B signal outputted from the interpolation processing unit 108 and outputs it as a 4 KB image signal.

First Embodiment: Generation of Diagonal Contour Correction Signal with Self-Signal Next, an embodiment of generating a diagonal contour correction signal with a self-signal will be described with reference to FIGS. 3A and 7A.

FIG. 3A is a block diagram of a multi-scan line diagonal contour correction unit according to one embodiment of the present invention.

Since the diagonal contour correction units 14R, 14G and 14B have the same configuration, the following description will be given in conjunction with the diagonal contour correction unit 14R.

Figure 7A:
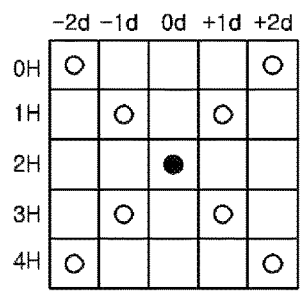
FIGS. 7A, 7B and 7C are explanatory auxiliary views of FIGS. 3A, 3C and 3D, respectively.

FIG. 7A is an explanatory auxiliary view of FIG. 3A.

Even though the diagonal resolution and the modulation depth decrease due to diagonal interpolations of G1 and G2 in the processing of the interpolation processing unit 108 in FIG. 2, the correction can be performed by the diagonal contour correction unit 114.

In FIG. 3A, the diagonal contour correction unit 14R reads 2H0d (image data), as a pixel to be corrected, from a frame memory M0 and outputs it to an adder 24 via an adder P4.

The diagonal contour correction unit 14R, in order to generate an upward left diagonal contour correction signal for the pixel of the 2H0d, reads 0H−2d, 1H−1d, 3H+1d and 4H+2d from the frame memory M0. Then, a subtractor N0 converts 0H−2d into a negative number and outputs it to an adder 20, a subtractor N2 converts 1H−1d into a negative number and outputs it to an adder 22, a subtractor N5 converts 3H+1d into a negative number and outputs it to an adder 25, and a subtractor N7 converts 4H+2d into a negative number and outputs it to an adder 27.

Further, the diagonal contour correction unit 14R, in order to generate an upward right diagonal contour correction signal for the pixel of the 2H0d, reads 0H+2d, 1H+1d, 3H−1d and 4H−2d from the frame memory M0. Then, a subtractor N1 converts 0H+2d into a negative number and outputs it to an adder 21, a subtractor N3 converts 1H+1d into a negative number and outputs it to an adder 23, a subtractor N6 converts 3H−1d into a negative number and outputs it to an adder 26, and a subtractor N8 converts 4H−2d into a negative number and outputs it to the adder 27.

Further, the CPU 106 may control the levels of the adder P4 and the subtractors N0 to N8.

Further, the diagonal contour correction unit 14R is configured such that the adders 20 to 27 add up the input data inputted thereto, a small/large amplitude compression limiter 31 limits or compresses the added up data to a level within a predetermined range, a multiplier 32 amplifies or attenuates the output data of the small/large amplitude compression limiter 31 to a predetermined level and inputs the output data therefrom to an adder 33 as a diagonal contour correction signal, and the adder 33 adds the diagonal contour correction signal to 2H0d of the signal to be corrected and outputs it as a corrected signal.

Further, the level of the diagonal contour correction signal is controlled by the multiplier 32 in such a manner that the level of 2H0d determined by an image level determination unit 28 and a level control signal from the CPU 106 are multiplied by a multiplier 29 and the multiplied result is inputted to the multiplier 32.

Next, a method of generating a multi-pixel contour correction signal according to an embodiment of the present invention will be described with reference to FIGS. 6A to 6E.

FIGS. 6A to 6E schematically illustrate the method of generating the multi-pixel contour correction signal according to the embodiment of the present invention.

FIG. 6A shows a signal before vertical contour correction. FIG. 6B shows a 5-pixel-of-contour correction signal. FIG. 6C shows a 3-pixel-of-contour correction signal. FIG. 6D shows a signal after correcting 5 pixels and 3 pixels of contour (2-pixel-of-contour emphasized signal). FIG. 6E shows a signal after correcting 3 pixels of contour (1-pixel-of-contour emphasized signal).

By adding the 5-pixel-of-contour correction signal shown in FIG. 6B and the 3-pixel-of-contour correction signal shown in FIG. 6C, the diagonal contour of the signal after correcting 5 pixels and 3 pixels of contour (2-pixel-of-contour emphasized signal) shown in FIG. 6D is reproduced.

On the other hand, in the signal after correcting 3 pixels of contour (1-pixel-of-contour emphasized signal) shown in FIG. 6E, when the diagonal modulation depth decreases from a low frequency, a false negative vertical contour occurs before and after the diagonal contour due to overshoot or undershoot, and it cannot be satisfactorily corrected due to the decrease in modulation depth.

In the image pickup device according to the embodiment of the present invention, since left and right diagonal contour corrections as well as horizontal and vertical contour corrections are symmetrical, the diagonal contour correction unit of FIG. 3A can output an image signal which has undergone contour correction with suppressed overshoot and undershoot even if the diagonal resolution and the modulation depth are decreased due to diagonal interpolations of G1 and G2 for the pixels of the image pickup elements of the four plates.

Further, the number of image data signals to be read from the frame memory M0 in FIG. 3A is not limited to nine, and it may be a larger natural number.

In the case where the number of image data signals to read from the frame memory M0 is not a large number, it is preferable that the number of image data signals to be read from the frame memory is 4N+1 (N is a natural number) so that the left and right diagonal contour corrections are symmetrical.

That is, in the case of performing simple diagonal contour correction, the number of image data signals to be read from the frame memory M0 may be five.

Second Embodiment: Addition of the Diagonal Contour Correction Signal Generated from the G Signal to the R Signal and the B Signal Next, an interpolation process according to one embodiment of the present invention will be described with reference to FIG. 3B.

Figure 3B:
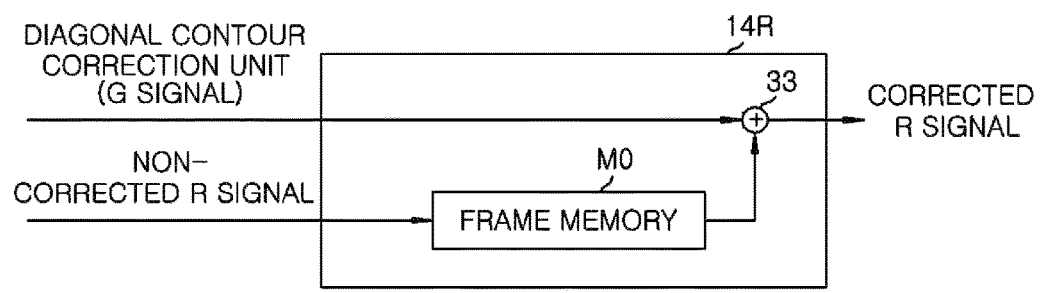
FIG. 3B is a block diagram of a multi-scan line diagonal contour correction unit according to one embodiment of the present invention.

FIG. 3B is a block diagram of a multi-scan line (H) diagonal contour correction unit according to one embodiment of the present invention.

The diagonal contour correction unit 14R shown in FIG. 3B is configured such that the frame memory M0 delays a non-corrected input R signal by two scan lines (2H), and the adder 33 adds the delayed signal to the diagonal contour correction signal (signal generated by using the same signal processing as shown in FIG. 3A) generated from the G signal and outputs it as a corrected R signal.

The same can apply to diagonal contour correction of the B signal.

Third Embodiment: Individually Varying Center Frequencies of Upward Right Diagonal Contour Correction and Upward Left Diagonal Contour Correction Next, contour correction according to one embodiment of the present invention will be described with reference to FIGS. 3C, 3D, 3E, 8A, 8B, 9A and 9B.

Figure 3C:
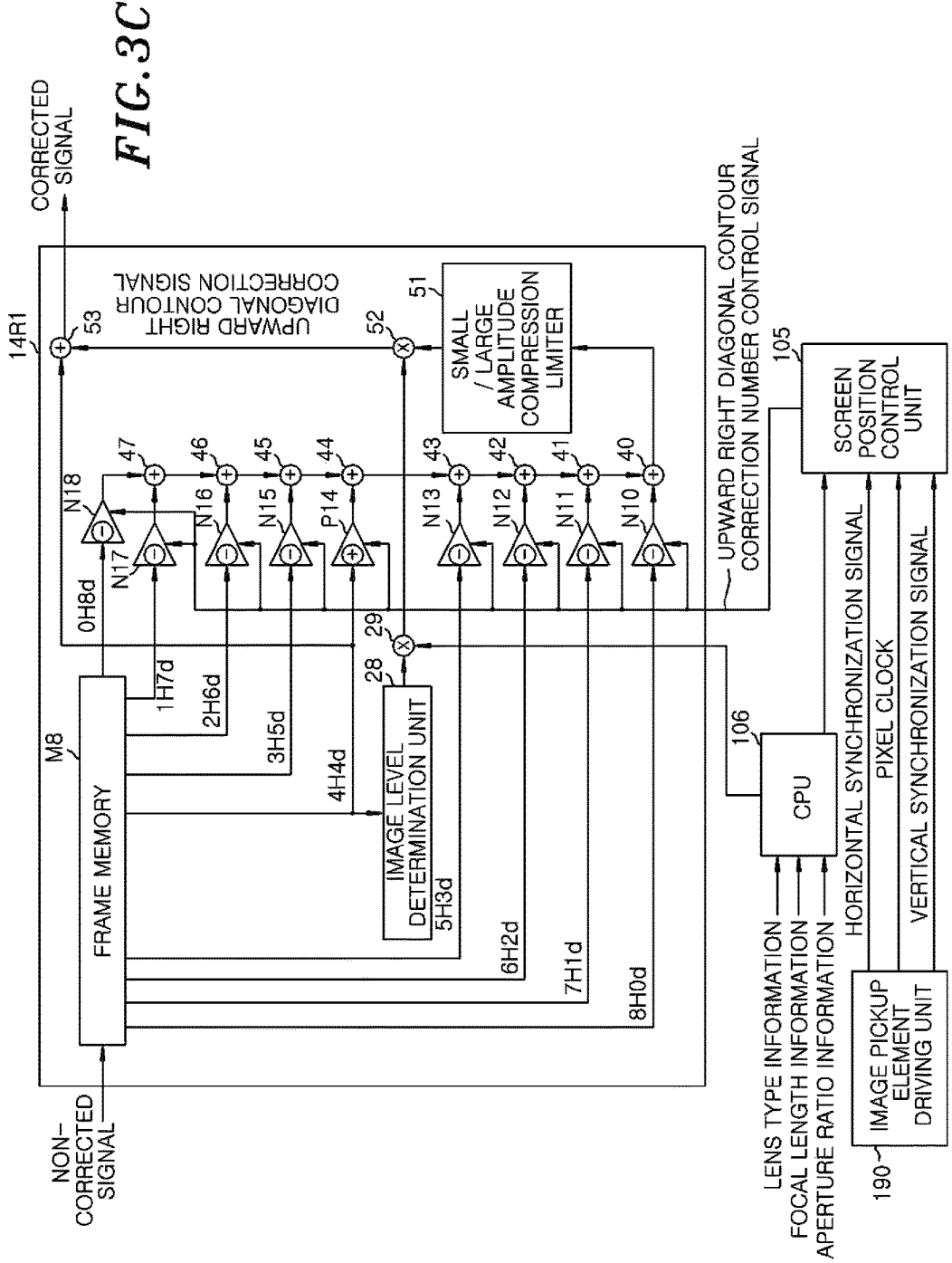
FIG. 3C is a block diagram of an upward right diagonal contour correction unit according to one embodiment of the present invention.
Figure 3E:
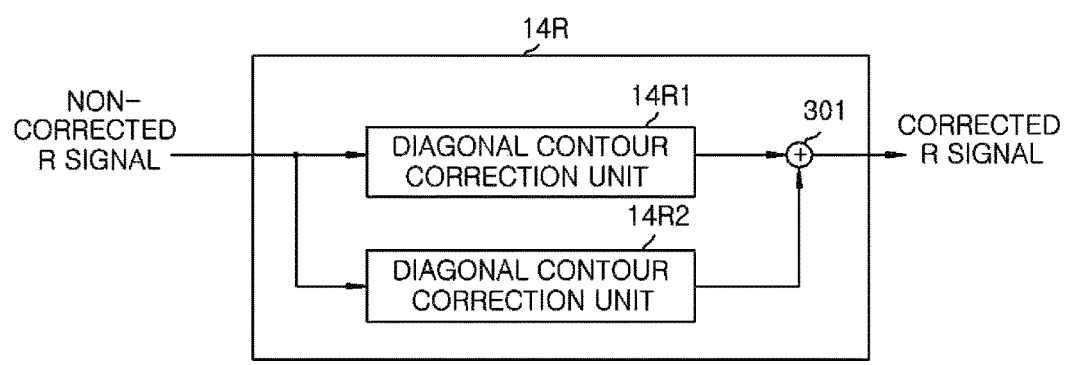
FIG. 3E is a block diagram explaining an operation of the diagonal contour correction unit according to one embodiment of the present invention.
Figure 9A:
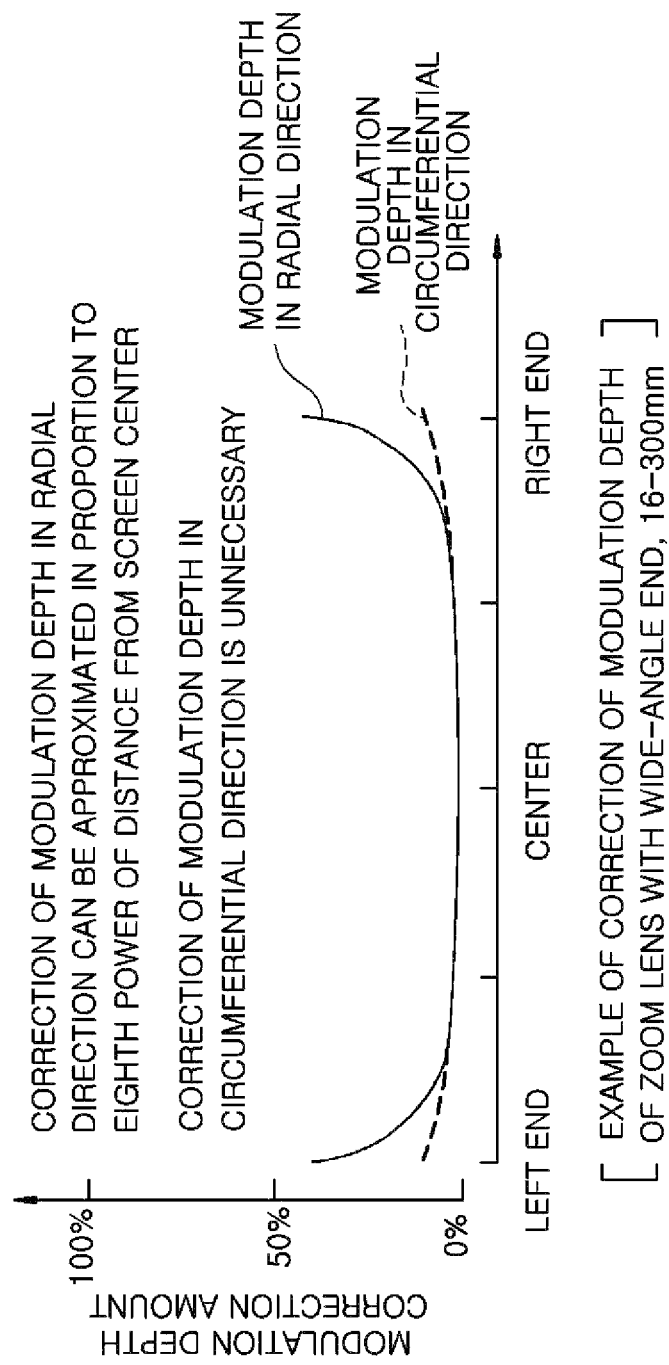

FIG. 3C is a block diagram of an upward right diagonal contour correction unit according to one embodiment of the present invention. FIG. 3D is a block diagram of an upward left diagonal contour correction unit according to one embodiment of the present invention. FIG. 3E is a block diagram explaining an operation of the diagonal contour correction unit according to one embodiment of the present invention. FIGS. 8A and 8B are schematic diagrams showing a change in modulation depth of a lens whose spherical aberration and coma aberration are sufficiently corrected and whose astigmatism is insufficiently corrected. FIGS. 9A and 9B are schematic diagrams showing correction of the modulation depth of a lens whose spherical aberration and coma aberration are sufficiently corrected and whose astigmatism is insufficiently corrected.

Since the diagonal contour correction unit 14R, 14G and 14B have the same configuration, the following description will be given in conjunction with the diagonal contour correction unit 14R.

The lens 101 is an apochromatic lens whose chromatic aberration is corrected at three wavelengths and whose spherical aberration and coma aberration are corrected at two wavelengths.

The diagonal contour correction unit according to one embodiment of the present invention includes an acquiring unit configured to acquire information on a relationship between the scan line number, the horizontal pixel number and the frequency-based correction amount of the contour correction obtained by approximating the modulation depth correction amount by the square, the fourth power, the sixth power, the eighth power and the tenth power of the distance $(v-V/2)$ $(h-H/2)$ from the center of the screen based on the number V of scan lines, the scan line number v, the number H of horizontal pixels and the horizontal pixel number h. The diagonal contour correction unit further includes a calculating unit configured to calculate a correction amount for each frequency in upward right diagonal contour correction and a correction amount for each frequency in upward left diagonal contour correction based on the scan line number and the horizontal pixel number obtained from a scan line and a horizontal pixel counter, and a control unit configured to individually control the upward right diagonal contour correction and the upward left diagonal contour correction for each frequency.

That is, in the present embodiment, the center frequency of the upward right diagonal contour correction and the center frequency of the upward left diagonal contour correction are individually varied in proportion to the even power of the distance from the screen center.

Specifically, in FIGS. 8A and 8B schematically showing a change in modulation depth of a lens whose spherical aberration and coma aberration are sufficiently corrected and whose astigmatism is insufficiently corrected, diagonal modulation depth correction in a radial direction is necessary only at four ends in the case of 16-300 mm which is an example of a zoom lens with a wide-angle end as shown in FIG. 8A.

In the case of 85 mmF1.8 which is an example of a medium telephoto lens as shown in FIG. 8B, diagonal modulation depth correction in a circumferential direction is necessary only at four ends.

As shown in FIGS. 9A and 9B, in the correction of the modulation depth of a lens whose spherical aberration and coma aberration are sufficiently corrected and whose astigmatism is insufficiently corrected, a correction amount for each frequency of the modulation depth is calculated, individually for the horizontal modulation depth correction and the vertical modulation depth correction, in proportion to the eighth power of the distance $(v-V/2)$ $(h-H/2)$ from the screen center uniformly within the screen.

That is, in a four-plate camera having an R image pickup element, a G1 image pickup element, a G2 image pickup element, a B image pickup element and a frame memory to perform diagonal pixel offset by the G1 image pickup element and the G2 image pickup element, diagonal contour correction in addition to horizontal contour correction and vertical contour correction are performed with an apochromatic lens whose chromatic aberration is corrected at three wavelengths and whose spherical aberration and coma aberration are corrected at two wavelengths.

Further, the embodiment of the present invention may also be applied to a high definition (HD) or higher resolution (e.g., 1K, 2K, 4K, and 8K) image pickup device having an aspect close to a square such as 4:3 or 3:2.

In FIGS. 3C and 4D, the CPU 106 acquires and stores information on the product type, focal length and aperture ratio of an attached lens, and information on the modulation depth in a circumferential direction and the modulation depth in a radial direction corresponding to the focal length and the aperture ratio of the attached lens.

The screen-position control unit 105 inputs a horizontal synchronization signal, a pixel clock and a vertical synchronization signal outputted from the image-pickup-element driving unit 190, and calculates an upward left and right diagonal contour correction amount for each diagonal frequency according to the procedure or acts set forth below.

Further, the screen-position control unit 105 acquires lens information on the product type, the focal length, the aperture ratio, the circumferential modulation depth and the radial modulation depth from the CPU 106.

Further, the screen-position control unit 105 calculates, from the vertical synchronization signal, the horizontal synchronization signal and the pixel clock, an upward right diagonal contour (modulation depth) correction amount and an upward left diagonal contour (modulation depth) correction amount for each diagonal frequency, corresponding to screen positions in proportion to the distance (v−V/2 where the number of scan lines is V and the scan line number is v and h−H/2 where the number of horizontal pixels is H and the horizontal pixel number is h) of the pixel corresponding to the image signal from the screen center, in proportion to the square of the distance of the pixel from the screen center, in proportion to the fourth power of the distance of the pixel from the screen center, in proportion to the sixth power of the distance of the pixel from the screen center, in proportion to the eighth power of the distance of the pixel from the screen center, and the like.

Next, the upward right diagonal contour correction for individually varying the center frequency of the upward right diagonal contour correction in proportion to the even power of the distance from the screen center will be described with reference to FIGS. 3C and 7C.

Since the diagonal contour correction unit 14R1, 14G1 and 14B1 have the same configuration, the following description will be given in conjunction with the diagonal contour correction unit 14R1.

Figure 7B:
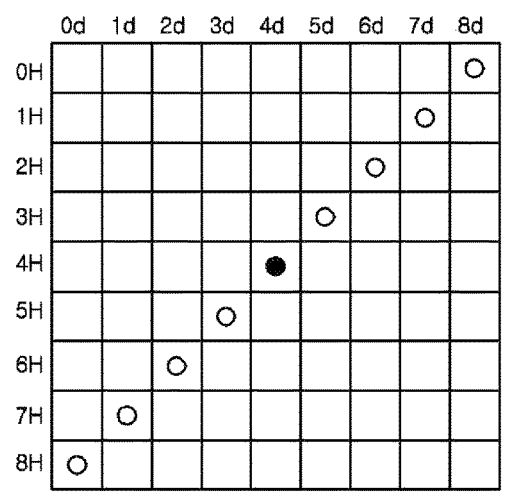

FIG. 7B is an explanatory auxiliary view of FIG. 3C.

In FIG. 3C, the diagonal contour correction unit 14R1 reads 4H4d (image data), as a signal to be corrected, from a frame memory M8 and outputs it to an adder 44 via an adder P14.

The diagonal contour correction unit 14R1, in order to generate an upward right diagonal contour correction signal for the pixel of the 4H4d, reads 0H8d, 1H7d, 2H6d, 3H5d, 5H3d, 6H2d, 7H1d and 8H0d from the frame memory M8. Then, a subtractor N18 converts 0H8d into a negative number and outputs it to an adder 47, a subtractor N17 converts 1H7d into a negative number and outputs it to the adder 47, a subtractor N16 converts 2H6d into a negative number and outputs it to an adder 46, a subtractor N15 converts 3H5d into a negative number and outputs it to an adder 45, a subtractor N13 converts 5H3d into a negative number and outputs it to an adder 43, a subtractor N12 converts 6H2d into a negative number and outputs it to an adder 42, a subtractor N11 converts 7H1d into a negative number and outputs it to an adder 41, and a subtractor N10 converts 8H0d into a negative number and outputs it to an adder 40.

The screen position control unit 105 controls the adder P14 and the subtractors N10 to N18 by using a control signal for an upward right diagonal contour correction number.

Further, the diagonal contour correction unit 14R1 is configured such that the adders 40 to 47 add up the input data inputted thereto, a small/large amplitude compression limiter 51 limits or compresses the added up data to a level within a predetermined range, a multiplier 52 amplifies or attenuates the output data of the small/large amplitude compression limiter 51 to a predetermined level and inputs the output data therefrom to an adder 53 as a diagonal contour correction signal, and the adder 53 adds the diagonal contour correction signal to 4H4d of the signal to be corrected and outputs it as a corrected signal.

Further, the level of the upward right diagonal contour correction signal is controlled by the multiplier 52 in such a manner that the level of 4H4d determined by the image level determination unit 28 and a level control signal from the CPU 106 are multiplied by the multiplier 29 and the multiplied result is inputted to the multiplier 52.

Next, the upward left diagonal contour correction for individually varying the center frequency of the upward left diagonal contour correction in proportion to the even power of the distance from the screen center will be described with reference to FIGS. 3D and 7D.

Since the diagonal contour correction unit 14R2, 14G2 and 14B2 have the same configuration, the following description will be given in conjunction with the diagonal contour correction unit 14R2.

Figure 7C:
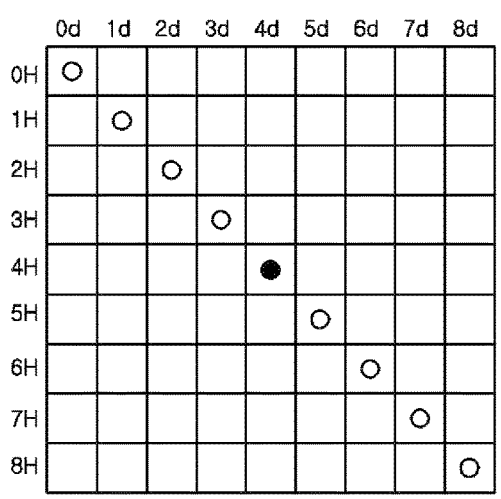

FIG. 7C is an explanatory auxiliary view of FIG. 3D.

In FIG. 3D, the diagonal contour correction unit 14R2 reads 4H4d (image data), as a signal to be corrected, from the frame memory M8 and outputs it to the adder 44 via the adder P14.

The diagonal contour correction unit 14R2, in order to generate an upward left diagonal contour correction signal for the pixel of the 4H4d, reads 8H8d, 7H7d, 6H6d, 5H5d, 3H3d, 2H2d, 1H1d and 0H0d from the frame memory M8. Then, the subtractor N18 converts 8H8d into a negative number and outputs it to the adder 47, the subtractor N17 converts 7H7d into a negative number and outputs it to the adder 47, the subtractor N16 converts 6H6d into a negative number and outputs it to the adder 46, the subtractor N15 converts 5H5d into a negative number and outputs it to the adder 45, the subtractor N13 converts 3H3d into a negative number and outputs it to the adder 43, the subtractor N12 converts 2H2d into a negative number and outputs it to the adder 42, the subtractor N11 converts 1H1d into a negative number and outputs it to the adder 41, and the subtractor N10 converts 0H0d into a negative number and outputs it to the adder 40.

The screen position control unit 105 controls the adder P14 and the subtractors N10 to N18 by using a control signal for an upward left diagonal contour correction number.

Further, the diagonal contour correction unit 14R2 is configured such that the adders 40 to 47 add up the input data inputted thereto, the small/large amplitude compression limiter 51 limits or compresses the added up data to a level within a predetermined range, and the multiplier 52 amplifies or attenuates the output data of the small/large amplitude compression limiter 51 to a predetermined level and outputs it as an upward left diagonal contour correction signal.

Further, the level of the upward left diagonal contour correction signal is controlled by the multiplier 52 in a such a manner that the level of 4H4d determined by the image level determination unit 28 and a level control signal from the CPU 106 are multiplied by the multiplier 29 and the multiplied result is inputted to the multiplier 52.

The number of the subtractors of the diagonal contour correction unit 14R1 and the diagonal contour correction unit 14R2 is preferably 7 or more (or 4 or 6) in the upward right diagonal correction and the upward left diagonal correction, respectively.

Next, diagonal contour correction will be described with reference to FIG. 3E.

In FIG. 3E, the diagonal contour correction unit 14R inputs a non-corrected input R signal to the diagonal contour correction unit 14R1 and the diagonal contour correction unit 14R2.

An adder 301 adds the R signal corrected by the upward right diagonal correction signal outputted from the diagonal contour correction unit 14R1 and the upward left diagonal correction signal outputted from the diagonal contour correction unit 14R2, and outputs it as a corrected R signal.

Fourth Embodiment: Contour Correction Using Electronic Zoom

In the fourth embodiment, only differences from the first embodiment and the second embodiment will be described.

In the operations of the first embodiment and the second embodiment, a diagonal contour correction signal generated from a 4K image signal whose diagonal modulation depth is reduced by diagonal interpolations of G1 and G2 is added to a 4K image signal.

A diagonal contour correction signal generated from an electronically zoomed 4K image signal generated from a 4K image signal whose diagonal modulation depth is reduced by diagonal interpolations of G1 and G2 may be added to an electronically zoomed 4K image signal.

Even if the 4K image signal is electronically zoomed, since the diagonal modulation depth is reduced by diagonal interpolations of G1 and G2, diagonal contour correction is effective.

The electronic zooming is a function of digitally enlarging an image by changing a reading interval of the frame memories M0 and M8.

A diagonal contour correction signal generated from an electronically zoomed 2K image signal for a viewfinder generated from a 4K image signal whose diagonal modulation depth is reduced by diagonal interpolations of G1 and G2 may be added to an electronically zoomed 2K image signal.

Since the 2K image signal is also electronically zoomed while the diagonal modulation depth is reduced by diagonal interpolations of G1 and G2, the diagonal contour correction is effective.

The image pickup device according to the embodiments of the present invention may be a four-plate camera having R, G1, G2 and B image pickup elements to perform diagonal pixel offset with the G1 and G2 image pickup elements and may perform contour correction for enhancing right and left diagonal contour corrections having a low modulation depth to improve visually important diagonal contour and modulation depth.

Although the present invention has been described above in detail, the present invention is not limited to the image pickup device described above, and may be widely applied to other image pickup devices.

INDUSTRIAL AVAILABILITY

The present invention can be applied to an image pickup device and an image pickup method using an image pickup device.

This application claims the benefit of priority to Japanese Patent Application No. 2014-173902 filed on Aug. 28, 2014, the disclosure of which is incorporated herein by reference in its entirety.

EXPLANATION OF REFERENCE SYMBOLS

101: lens
102: image pickup device
103G1: first green (G1) image pickup element
103G2: second green (G2) image pickup element
103R: red (R) image pickup element
103B: blue (B) image pickup element
104: image signal processing unit
105: screen-position control unit
106: CPU
107: magnification chromatic aberration and alignment error correction unit
108: interpolation processing unit
209: pixel delay unit
210: bit shifting unit
111, 112, 113: LPF unit
114: diagonal contour correction unit
115: selector
118, 119, 20 to 27, 33, 40 to 47, 301: adder
28, 48: image level determination unit
31, 51: small/large amplitude compression limiter
29, 49, 32, 52: multiplier
M0: frame memory
116, N0 to N3, N5 to N8, N10 to N13, N15 to N18: subtractor
P4, P14: adder

What is claimed is:

1. An image pickup method of an image pickup device having two green image pickup elements, a red image pickup element and a blue image pickup element, wherein the two green image pickup elements perform diagonal pixel offset,
the image pickup method comprising:
generating a diagonal contour correction signal from respective image signals of two pixels on an upward left diagonal side, two pixels on an upward right diagonal side, two pixels on a downward left diagonal side, and two pixels on a downward right diagonal side with respect to a contour correction target pixel; and
adding the diagonal contour correction signal to an image signal of the contour correction target pixel.

2. An image pickup device having two green image pickup elements, a red image pickup element and a blue image pickup element, wherein the two green image pickup elements perform diagonal pixel offset,
the image pickup device comprising:
a first generating unit configured to generate an upward right diagonal contour correction signal from respective image signals of four pixels on an upward right diagonal side and four pixels on a downward left diagonal side with respect to a contour correction target pixel;
a second generating unit configured to generate an upward left diagonal contour correction signal from respective image signals of four pixels on an upward left diagonal side and four pixels on a downward right diagonal side with respect to the contour correction target pixel; and
an adder, wherein the adder adds the upward right diagonal contour correction signal and the upward left diagonal contour correction signal to an image signal of the contour correction target pixel.

3. An image pickup device having two green image pickup elements, a red image pickup element and a blue image pickup element, wherein the two green image pickup elements perform diagonal pixel offset, the image pickup device comprising:

a screen position control unit configured to calculate, from a vertical synchronization signal, a horizontal synchronization signal and a pixel clock, an upward right diagonal contour correction amount and an upward left diagonal contour correction amount for each diagonal frequency, corresponding to screen positions in proportion to a distance of a pixel corresponding to an image signal from a screen center, in proportion to the square of the distance of the pixel from the screen center, in proportion to the fourth power of the distance of the pixel from the screen center, in proportion to the sixth power of the distance of the pixel from the screen center, and in proportion to the eighth power of the distance of the pixel from the screen center.

4. The image pickup device of claim 3, further comprising a central processing unit configured to acquire information on a product type, focal length and aperture ratio of an attached lens, and information on a modulation depth in a circumferential direction and a modulation depth in a radial direction corresponding to the focal length and the aperture ratio of the attached lens, and output the acquired information to the screen position control unit, wherein the screen position control unit is configured to output a control signal for generating a contour correction signal based on the acquired information.

* * * * *